(12) United States Patent
Takaoki

(10) Patent No.: US 10,491,290 B2
(45) Date of Patent: Nov. 26, 2019

(54) CONTROLLER IN WIRELESS COMMUNICATION WITH OPERATION PANEL, WIRELESS MODULE, AND WIRELESS REPEATER

(71) Applicant: FANUC CORPORATION, Yamanashi (JP)

(72) Inventor: Hidesato Takaoki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/715,261

(22) Filed: Sep. 26, 2017

(65) Prior Publication Data

US 2018/0091216 A1 Mar. 29, 2018

(30) Foreign Application Priority Data

Sep. 27, 2016 (JP) ................. 2016-188848

(51) Int. Cl.
| | | |
|---|---|---|
| *H04W 72/04* | (2009.01) | |
| *H04B 7/155* | (2006.01) | |
| *G08C 17/02* | (2006.01) | |
| *G08C 17/00* | (2006.01) | |
| *H04J 1/10* | (2006.01) | |

(52) U.S. Cl.
CPC ......... *H04B 7/15592* (2013.01); *G08C 17/00* (2013.01); *G08C 17/02* (2013.01); *H04B 7/15542* (2013.01); *H04W 72/0453* (2013.01); *G08C 2201/40* (2013.01); *G08C 2201/42* (2013.01); *H04J 1/10* (2013.01)

(58) Field of Classification Search
None
See application file for complete search history.

(56) References Cited

U.S. PATENT DOCUMENTS

| | | | |
|---|---|---|---|
| 2008/0222478 A1 | 9/2008 | Tamaki | |
| 2010/0106299 A1* | 4/2010 | Nagata | ..................... B25J 13/06 700/264 |
| 2015/0138306 A1* | 5/2015 | Umehara | ................ H04L 41/28 348/14.12 |

(Continued)

FOREIGN PATENT DOCUMENTS

| | | |
|---|---|---|
| CN | 101094013 A | 12/2007 |
| JP | 2002-233978 A | 8/2002 |
| JP | 2005-219147 A | 8/2005 |

(Continued)

*Primary Examiner* — Kodzovi Acolatse
(74) *Attorney, Agent, or Firm* — Hauptman Ham, LLP

(57) ABSTRACT

A controller, a wireless module and a wireless repeater, by which a possibility of interruption of wireless communication between the controller and a wireless operation panel can be significantly reduced. The wireless system includes a robot and a controller for controlling the robot. When the robot is to be taught, a human uses a wireless teaching pendant so as to teach the robot. The controller has a wireless module for wirelessly communicating with the teaching pendant, and the wireless module is configured to receive a signal from the teaching pendant via at least one wireless repeater, as well as a signal directly transmitted from the teaching pendant. In other words, the wireless module receives a multiplexed signal generated by multiplexing signals from the teaching pendant by using at least one wireless repeater.

9 Claims, 6 Drawing Sheets

(56) References Cited

U.S. PATENT DOCUMENTS

2017/0214493 A1* 7/2017 Hampel .................... H04L 1/08
2018/0243917 A1* 8/2018 Takemoto ................ B25J 13/00

FOREIGN PATENT DOCUMENTS

| JP | 2007-42061 A | 2/2007 |
| --- | --- | --- |
| JP | 2007-233817 A | 9/2007 |
| JP | 2008-197856 A | 8/2008 |
| JP | 2010-228065 A | 10/2010 |
| JP | 2010-247279 A | 11/2010 |
| JP | 2011-652 A | 1/2011 |
| JP | 2014-179719 A | 9/2014 |
| JP | 2015-201728 A | 11/2015 |

* cited by examiner

CONTROLLER IN WIRELESS COMMUNICATION WITH OPERATION PANEL, WIRELESS MODULE, AND WIRELESS REPEATER

RELATED APPLICATIONS

The present application claims priority to Japanese Patent Application No. 2016-188848 filed Sep. 27, 2016, the disclosure of which is hereby incorporated by reference herein in its entirety.

BACKGROUND OF THE INVENTION

1. Field of the Invention

The preset invention relates to a controller for controlling a machine such as a robot and a machine tool, and capable of being in wireless communication with an operation panel used to teach the machine, and also relates to a wireless module and a wireless repeater.

2. Description of the Related Art

When a machine such as a robot or a CNC machine tool is to be operated or taught, a wireless operation panel, capable of being in wireless communication with a controller of the machine, may be used. For example, JP 2007-233817 A discloses an automatic machine system including: a mechanical unit having one or more drive mechanism; a controller for controlling driving of the mechanical unit; and a teaching device for operating the mechanical unit. This document describes that the teaching device includes: a teaching device communication part configured to wirelessly communicate with the controller; and a first LIVE signal monitoring part configured to monitor a LIVE signal at constant time intervals in the teaching device communication part, and that the controller includes: a controller communication part configured to wirelessly communicate with the teaching device; a second LIVE signal monitoring part configured to monitor a LIVE signal at constant time intervals in the controller communication part; and a driving part configured to drive the mechanical unit based on a command signal from the teaching device received in the controller communication part.

Further, JP 2011-000652 A discloses a robot control system, in which a portable teaching pendant is wirelessly communicated with a robot controller, so that a robot can be controlled based on a command from the teaching pendant.

On the other hand, it is a well-known technique to detect deterioration of a receiving sensitivity of wireless communication, and switch a wireless channel from one to the other. For example, JP 2015-201728 A discloses a device control system including first, second and third devices, and a controller configured to control the devices by wireless communication, in which the controller is wirelessly communicated with the first device, the first device is wirelessly communicated with the second device, and the second device is wirelessly communicated with the third device. This document describes that, when the third device detects that the receiving sensitivity of the wireless communication is deteriorated, the second and third devices enter a channel change mode in which any control by the controller is not accepted, and then a wireless channel to be used between the second and third devices is changed.

Generally, when the robot or the CNC machine tool is operated or taught by using the wireless operation panel, and the wireless communication between the operation panel and the controller of the machine is interrupted, the motion of the machine is forcibly stopped and the teaching operation is interrupted, for safety. However, in a factory or field where the wireless communication is congested, the wireless communication may be often interrupted, and the teaching operation may be interrupted.

As one method for solving the above problem, an area where the wireless operation panel can be used may be limited within a predetermined distance (e.g., five meters) from a wireless access point in order to stabilize the wireless communication. However, in such a method, the usable area of the operation panel may be unduly limited, and the merit of wireless operation panel may be diminished.

SUMMARY OF THE INVENTION

Therefore, an object of the present invention is to provide a controller, a wireless module and a wireless repeater, by which a possibility of interruption of wireless communication between the controller and a wireless operation panel can be significantly reduced.

One aspect of the present invention provides a controller for controlling a machine, the controller comprising a wireless module configured to wirelessly communicate with a wireless operation panel used to operate the machine, wherein the wireless module is configured to receive a multiplexed signal generated by multiplexing signals from the wireless operation panel by using at least one wireless repeater.

The at least one wireless repeater may include another wireless module provided to another controller.

When there is a plurality of wireless repeaters, the controller may be configured to designate a wireless repeater used to multiplex the signals among the plurality of wireless repeaters.

When there is a plurality of wireless repeaters, the controller may be configured to inform an operator of a wireless repeater used to multiplex the signals among the plurality of wireless repeaters.

When there is a plurality of wireless repeaters, the controller may be configured to automatically judge and select a wireless repeater used to multiplex the signals among the plurality of wireless repeaters.

The multiplexed signal may be provided with information by which a point of time when the multiplexed signal is transmitted, and the controller may be configured to, when there is lacking data, complement the data by using a signal provided with the information.

Another aspect of the present invention provides a wireless module provided to a controller for controlling a machine, and configured to wirelessly communicate with a wireless operation panel used to operate the machine, wherein the wireless module is configured to, when the machine is not operated by a wireless signal and when another machine is operated by the wireless signal transmitted to another controller, receive the wireless signal and transfer the wireless signal to the other controller.

Still another aspect of the present invention provides a wireless repeater used for wireless communication between a controller for controlling a machine and a wireless operation panel used to operate the machine, wherein the wireless repeater is configured to receive a signal having one of frequencies which are respectively assigned to a plurality of controllers, and transfer the received signal to a controller among the plurality of controllers, corresponding to a frequency of the received signal.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
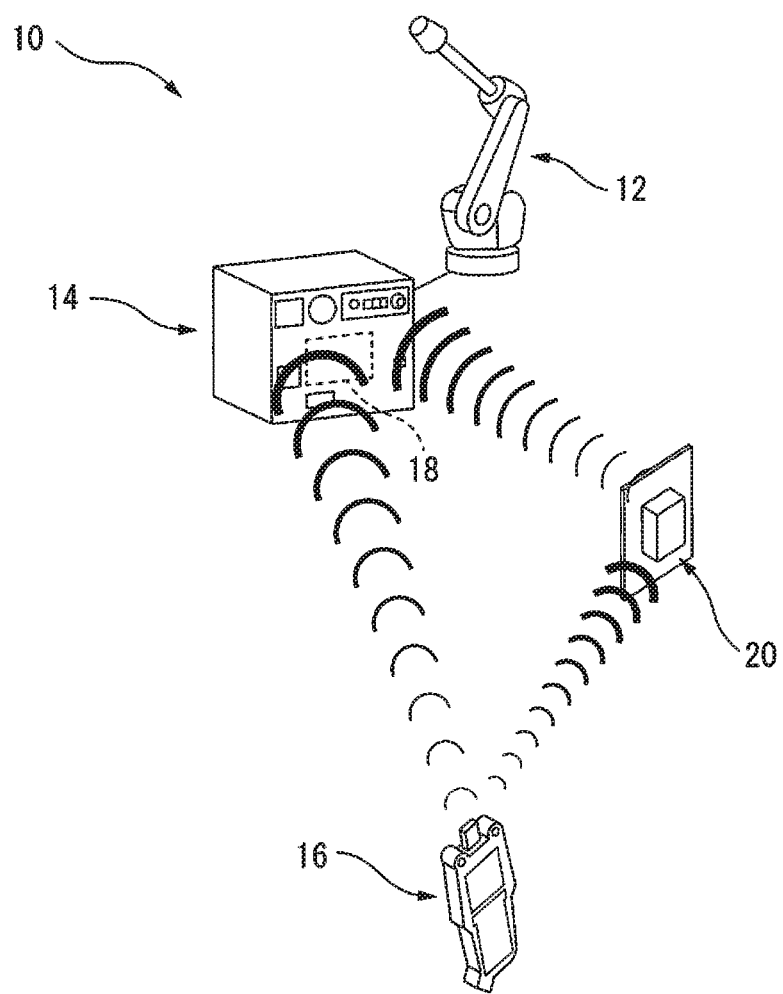
FIG. 1 is a schematic view showing a first embodiment of the present invention.

FIG. 1 is a schematic view showing a first embodiment of the present invention. A wireless (robot) system 10 of FIG. 1 includes a machine such as a robot 12 or a machine tool, and a controller 14 for controlling the machine. Concretely, controller 14 is configured to control the motion of robot 12 in production or teaching using robot 12. When robot 12 should perform a specified operation such as teaching, a human (operator) uses a wireless operation panel (in the embodiment, a wireless teaching pendant) 16 so as to carry out the teaching operation. Controller 14 has (generally, incorporates) a wireless module 18 for wirelessly communicating with teaching pendant 16.

As shown in FIG. 1, wireless system 10 has at least one wireless access point (or wireless repeater) 20, and wireless module 18 is configured to receive a signal from teaching pendant 16 via at least one wireless repeater 20, as well as a signal directly transmitted from teaching pendant 16. In other words, wireless module 18 is configured to receive a multiplexed signal generated by multiplexing signals from teaching pendant 16 by using at least one wireless repeater 20.

Figure 2:
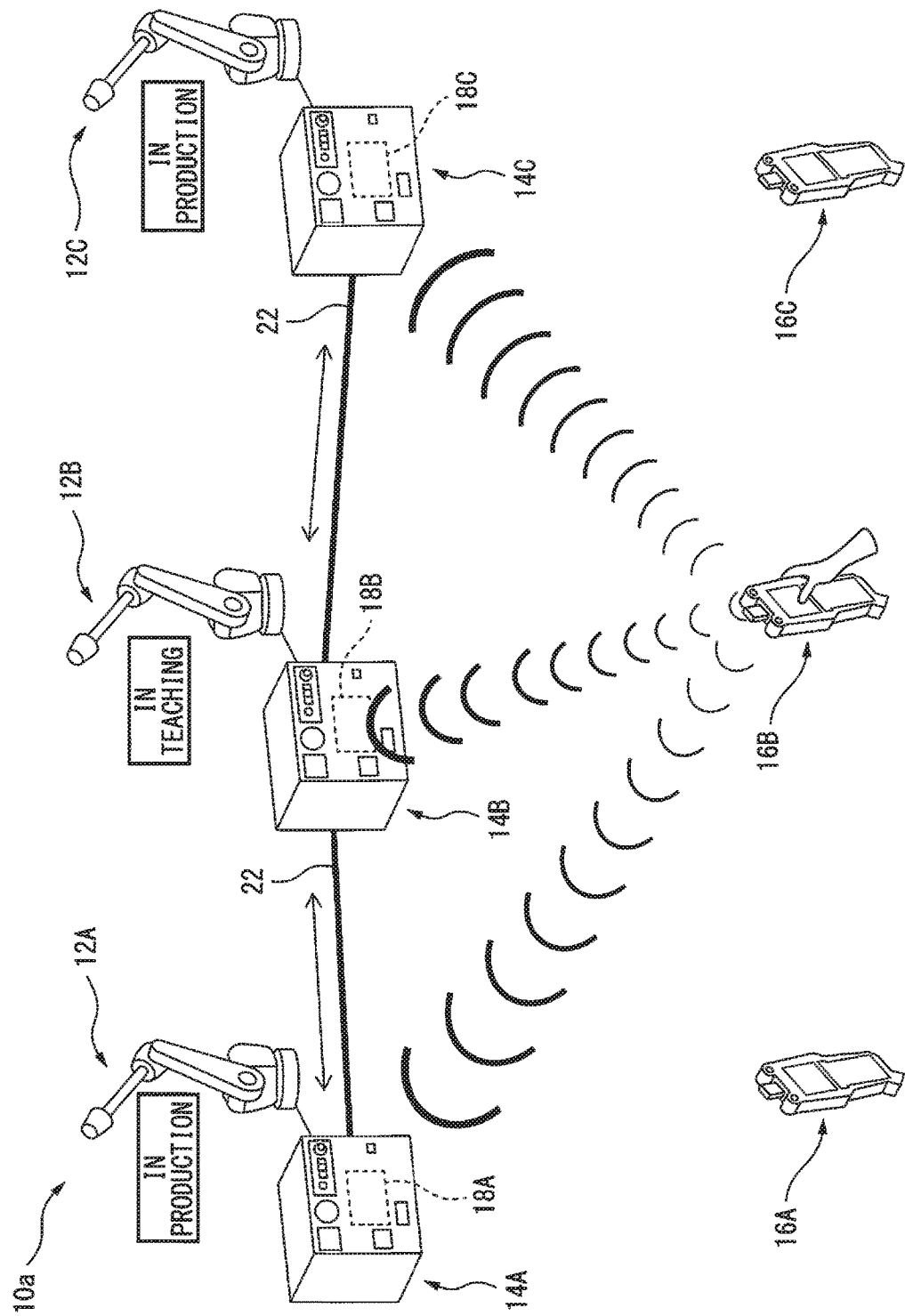
FIG. 2 is a schematic view showing a second embodiment of the present invention.

FIG. 2 is a schematic view showing a second embodiment of the present invention. A wireless system 10a of FIG. 2 includes a plurality of machines (in the embodiment, robots) 12A, 12B and 12C, and the same number of controllers 14A, 14B and 14C as the robots, which are configured to respectively control robots 12A, 12B and 12C. When robot 12A should perform a specified operation such as teaching, the human (operator) uses a wireless operation panel (in the embodiment, a wireless teaching pendant) 16A so as to carry out the teaching operation. Controller 14A has (generally, incorporates) a wireless module 18A for wirelessly communicating with teaching pendant 16A. Similarly, when robot 12B or 12C should perform a specified operation such as teaching, the human (operator) uses a wireless operation panel (in the embodiment, a wireless teaching pendant) 16B or 16C so as to carry out the teaching operation. Controller 14B has (generally, incorporates) a wireless module 18B for wirelessly communicating with teaching pendant 16B, and controller 14C has (generally, incorporates) a wireless module 18C for wirelessly communicating with teaching pendant 16C. Although this embodiment includes the same number of robots and controllers, the number of the robots may be different from the number of controller(s). For example, one controller may control the plurality of robots.

As shown in FIG. 2, controllers 14A, 14B and 14C are connected to each other by a network such as a factory network 22. Alternatively, controllers 14A, 14B and 14C may be communicably connected to each other by radio.

In the second embodiment, it is assumed that robot 12B is being taught (i.e., teaching pendant 16B is wirelessly communicating with controller 14B), and the other robots are in automatic operation such as a production process (i.e., teaching pendants 16A, 16C and wireless modules 18A, 18C are not in use). In this case, the wireless module of the robot controller, which is not used in the teaching operation (i.e., it is used in the automatic operation or suspended) has the function of wireless access point 20 as in the first embodiment, as explained below.

First, when a predetermined operation (vibration of the pendant, button operation or switching of an enable switch, etc.) for the teaching is performed in teaching pendant 16B, teaching pendant 16B wirelessly informs main controller 14B that the predetermined operation is performed, and also, the wireless repeaters (in this case, wireless modules 18A and 18C) are wirelessly informed that robot 12B (controller 14B) comes into the teaching mode. Next, communication frequencies (or channels) of wireless modules 18A and 18C are automatically switched to a communication frequency of pendant 16B during the wireless communication. In this regard, in order to avoid an erroneous motion of the robot (in this case, robots 12A and 12C) controlled by the sub controller, it is preferable that wireless modules 18A and 18C be electrically separated from the robot control system (i.e., robot 12A or 12C cannot be operated by a signal of channel other than the predetermined channel). Then, wireless modules 18A and 18C automatically transfer the data (signal) received from teaching pendant 16B to main controller 14B via network 22. In this regard, new information may be added to the received data.

The communication frequencies of wireless modules 18A and 18C may be switched by a communication (or command) from controller 14B in the teaching mode to controllers 14A and 14C. Alternatively, the communication frequencies of wireless modules 18A and 18C may be respectively switched by controllers 14A and 14C. For example, when a radio-frequency band is 2.4 GHz and the frequencies for the teaching in controllers 14A, 14B and 14C are determined at 20 MHz intervals (i.e., the frequencies of controllers 14A, 14B and 14C are set to 2.42 GHz, 2.44 GHz and 2.46 GHz, respectively), each controller can judge as to which controller (or robot) is in the teaching state (teaching mode) based on the frequency of the wireless signal received by the own wireless module.

As explained above, when robots 12A and 12C are not taught by wireless communication and robot 12B is taught by the wireless signal transmitted to controller 14B, wireless module 18B can receive the signal directly from teaching pendant 16B, as well as the signal from teaching pendant 16B after passing through at least one of wireless modules 18A and 18C (i.e., the latter signal is received and transferred by at least one of wireless modules 18A and 18C). In other words, the signal from teaching pendant 16B is received by controller 14B (wireless module 18B) as a multiplexed signal. In addition, the wireless module may automatically receive and transfer the signal, whereas the signal may be received and transferred by the operator (i.e., manually).

In any of the above first and second embodiments and third, fourth and fifth embodiments as explained below, when the wireless signal (or the safety signal) from the operation panel to the controller is interrupted during the teaching operation, the robot in teaching is (in many cases, immediately) stopped for the safety of the operator. In the prior art, when the wireless communication is congested, the wireless signal may be often interrupted. Therefore, the robot is stopped each time the wireless communication is interrupted, and then the teaching operation must be interrupted. On the other hand, when the wireless signals are multiplexed (i.e., the same signal is transmitted and received by using the plurality of routes) as in the above embodiment, the possibility that the wireless communication is simultaneously interrupted in all of the routes is extremely low. Therefore, in the embodiment, the interruption of the wireless communication can be avoided, thereby the teaching operation can be smoothly and efficiently carried out.

As explained above, the signals can be multiplexed by using the wireless access point, the wireless module of the controller of the robot which is not in the teaching mode, or the factory network, etc. In this regard, in many cases, the wireless module or the factory network is previously provided to the controller, without any relation to the present invention. Further, in the second embodiment, since the controller in the non-teaching state (in automatic operation, etc.) does not need to receive the safety signal from the teaching pendant, the wireless module which is not substantially operated can be used to multiplex the signals, without using a particular apparatus.

Figure 3:
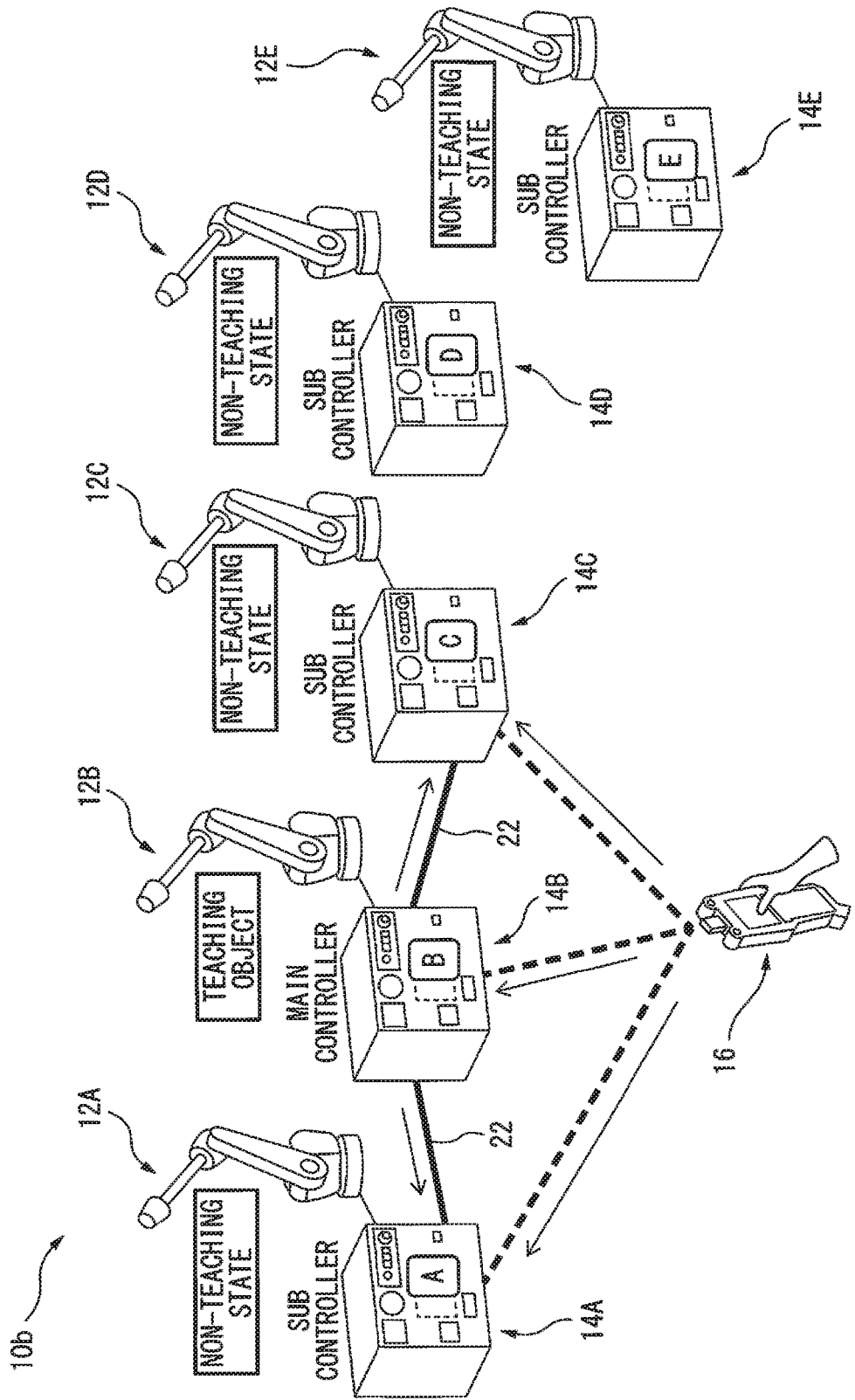
FIG. 3 is a schematic view showing a third embodiment of the present invention.

FIG. 3 is a schematic view showing a third embodiment of the present invention. A wireless system 10b of FIG. 3 corresponds to a modification of the second embodiment, and includes a plurality of machines (in the embodiment, robots) 12A, 12B, 12C, 12D and 12E, and the same number of controllers 14A, 14B, 14C, 14D and 14E as the robots, which are configured to respectively control robots 12A, 12B, 12C, 12D and 12E. When one of the robots should perform a specified operation such as teaching, the human (operator) uses a wireless operation panel (in the embodiment, a wireless teaching pendant) 16 so as to carry out the teaching operation. Controllers 14A to 14E have (generally, incorporate) wireless module A to E, respectively, for wirelessly communicating with teaching pendant 16. In addition, each of wireless modules A to E may have a configuration of a wireless repeater as in the first embodiment.

In the third embodiment including the plurality of wireless repeaters, it can be previously designated as to which wireless module (wireless repeater) should be used to multiplex the signals when one of the wireless teaching pendants enters the teaching mode. As exemplified in FIG. 3, when robot 12B is (the main machine) to be taught and the other robots are (the sub machines) in the non-teaching state (non-teaching mode), the operator (user) may previously designate the wireless module to be used as the wireless repeater in an initial setting of controller 14B. FIG. 3 shows that, among wireless modules (wireless repeaters) A to E included in the factory where wireless system 10b is installed, the operator designates wireless modules A, B and C in the initial setting.

In FIG. 3, when controller 14B (robot 12B) enters the teaching mode by being selected by the operation of teaching pendant 16, controller 14B informs wireless repeaters A and C (or controllers 14A and 14C) via network 22, etc., that controller 14B (robot 12B) enters the teaching mode, wherein wireless modules A and C are in the non-teaching state among wireless modules A, B and C designated in the initial setting. Therefore, in the embodiment of FIG. 3, the (safety) signals from teaching pendant 16 to controller 14B are multiplexed by the three transmission routes. In addition, the information that robot 12B enters the teaching mode may be transmitted from teaching pendant 16 to wireless modules A and C.

Figure 4:
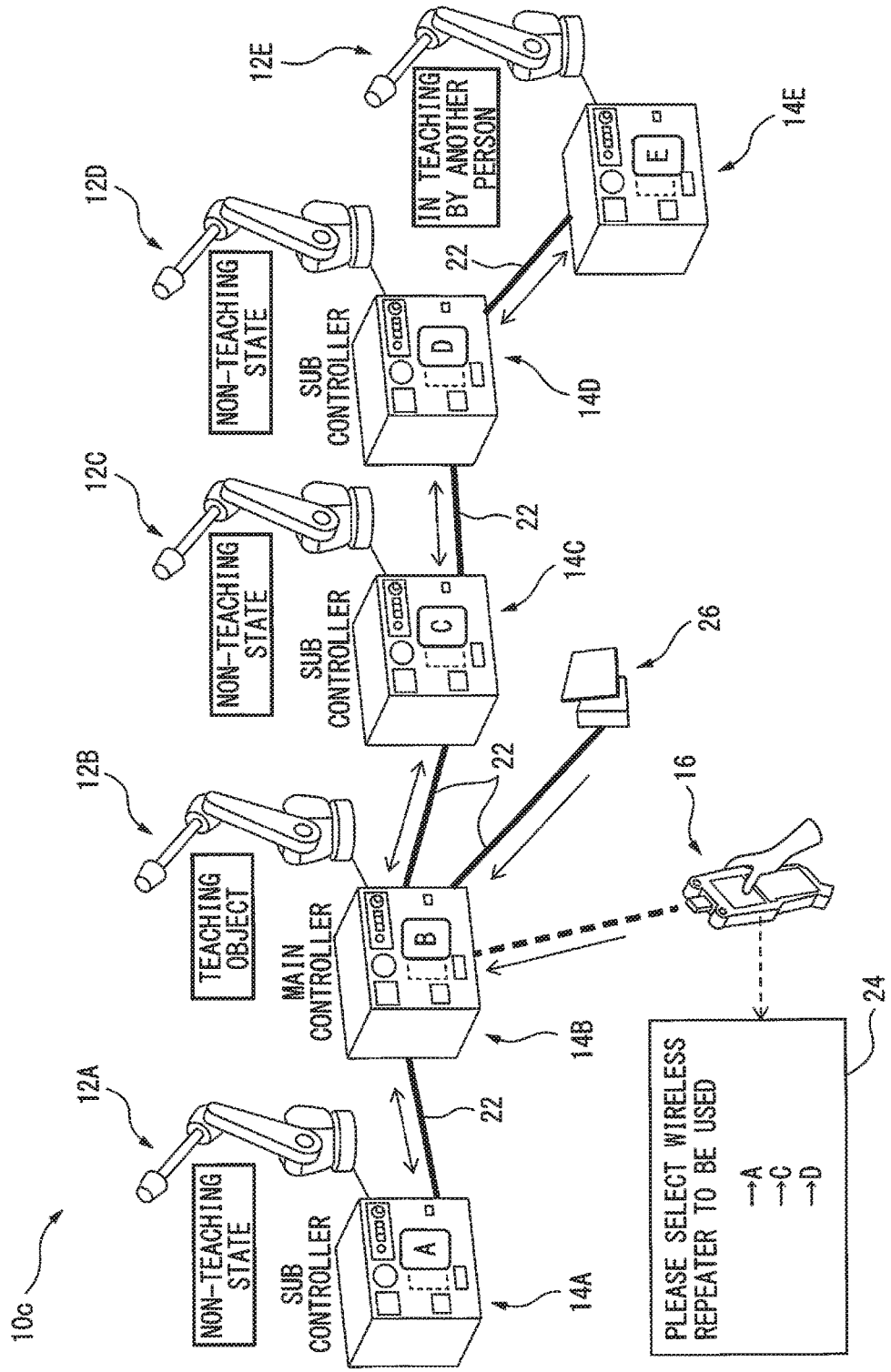
FIG. 4 is a schematic view showing a fourth embodiment of the present invention.

FIG. 4 is a schematic view showing a fourth embodiment of the present invention. In a wireless system 10c of FIG. 4, a subject matter different from the third embodiment will be mainly explained, and therefore, the same reference numerals are added to the components of the fourth embodiment corresponding to the components of the third embodiment, and detailed explanations thereof will be omitted.

In the fourth embodiment including the plurality of wireless repeaters, the operator is informed as to which wireless module (wireless repeater) can be used to multiplex the signals, and then the operator can select the wireless module to be used. For example, FIG. 4 shows that robot 12B is (the main machine) to be taught, robot 12E is being taught by another operator, and the other robots are (the sub machines) in the non-teaching state.

In wireless system 10c of FIG. 4, when controller 14B (robot 12B) is selected and brought into the teaching mode by the operation of wireless teaching pendant 16, the wireless repeater(s) capable of multiplexing the signals is(are) searched. Concretely, controller 14B obtains information of the states (the teaching mode or the automatic operation mode, etc.) of the other controllers via network 22. Alternatively, there may be provided a host computer 26 configured to communicate with each of controllers 14A to 14E, and host computer 26 may obtain the information regarding the state of each controller.

Next, as indicated by reference numeral 24, the wireless repeaters capable of being used to multiplex the signals can be listed and displayed on a display, etc., of teaching pendant 16. Alternatively, the operator may be informed of the usable wireless repeater in an auditory manner. By virtue of this, the operator can select the wireless repeater to be used by operating teaching pendant 16. In this regard, the operator may select one or more wireless repeater.

Figure 5:
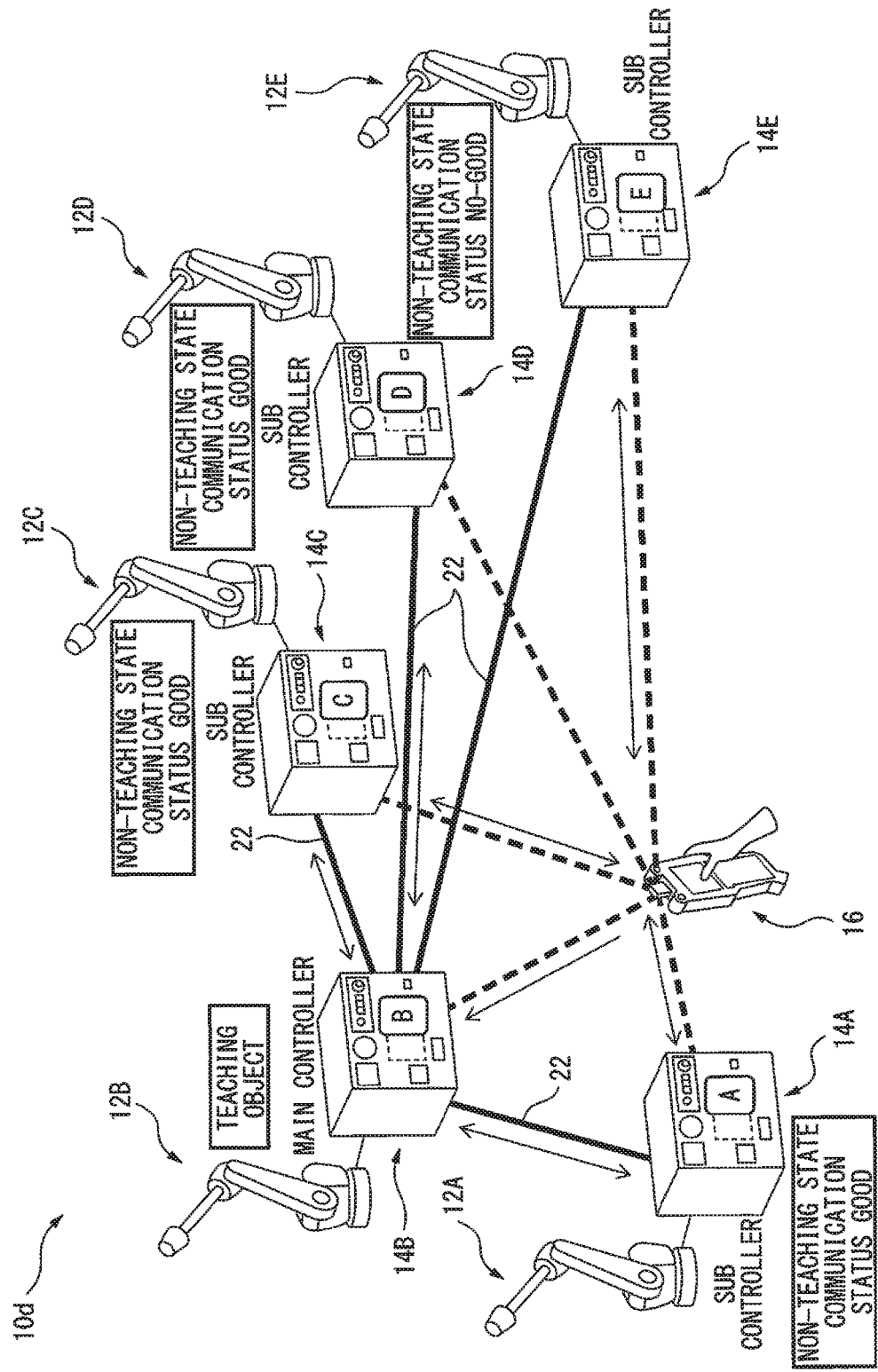
FIG. 5 is a schematic view showing a fifth embodiment of the present invention.

FIG. 5 is a schematic view showing a fifth embodiment of the present invention. In a wireless system 10d of FIG. 5, a subject matter different from the third or fourth embodiment will be mainly explained, and therefore, the same reference numerals are added to the components of the fifth embodiment corresponding to the components of the third of fourth embodiment, and detailed explanations thereof will be omitted.

In the fifth embodiment including the plurality of wireless repeaters, when one of the robots is to be taught, one or more wireless repeater, the communication state of which is good, can be automatically judged and selected. For example, FIG. 5 shows that robot 12B is (the main machine) to be taught, and the other robots are (the sub machines) in the non-teaching state.

In FIG. 5, when controller 14B (robot 12B) is selected and brought into the teaching mode by the operation of wireless teaching pendant 16, main controller 14B can automatically judge and select the wireless module of the controller, among the sub controllers in the non-teaching state, wherein the communication state from teaching pendant 16 to main controller 14B via the selected sub controller is good (e.g., a success rate of the data communication in the past is 90% or more). In the example of FIG. 5, since the communication state of controller 14E (wireless module E) only is no-good, the wireless repeaters used to multiplex the signals are wireless modules A, C and D. In addition, the communication state of each module can be judged by learning using the past data.

In the second, third, fourth or fifth embodiment, the function of the wireless module for multiplexing the signals may be provided to a wireless repeater, such as wireless access point 20 of FIG. 1, which is not contained in the controller. In this case, the wireless repeater can receive the signal having either of the frequencies (e.g., 2.42 GHz, 2.44

GHz and 2.46 GHz) assigned to the respective controllers from the wireless teaching pendant, and then, can transfer the received signal to the controller corresponding to the frequency of the received signal. For example, when the frequency of the received signal is 2.42 GHz, the wireless repeater transfers the received signal to controller 14A. Otherwise, when the frequency of the received signal is 2.44 GHz, the wireless repeater transfers the received signal to controller 14B.

Figure 6:
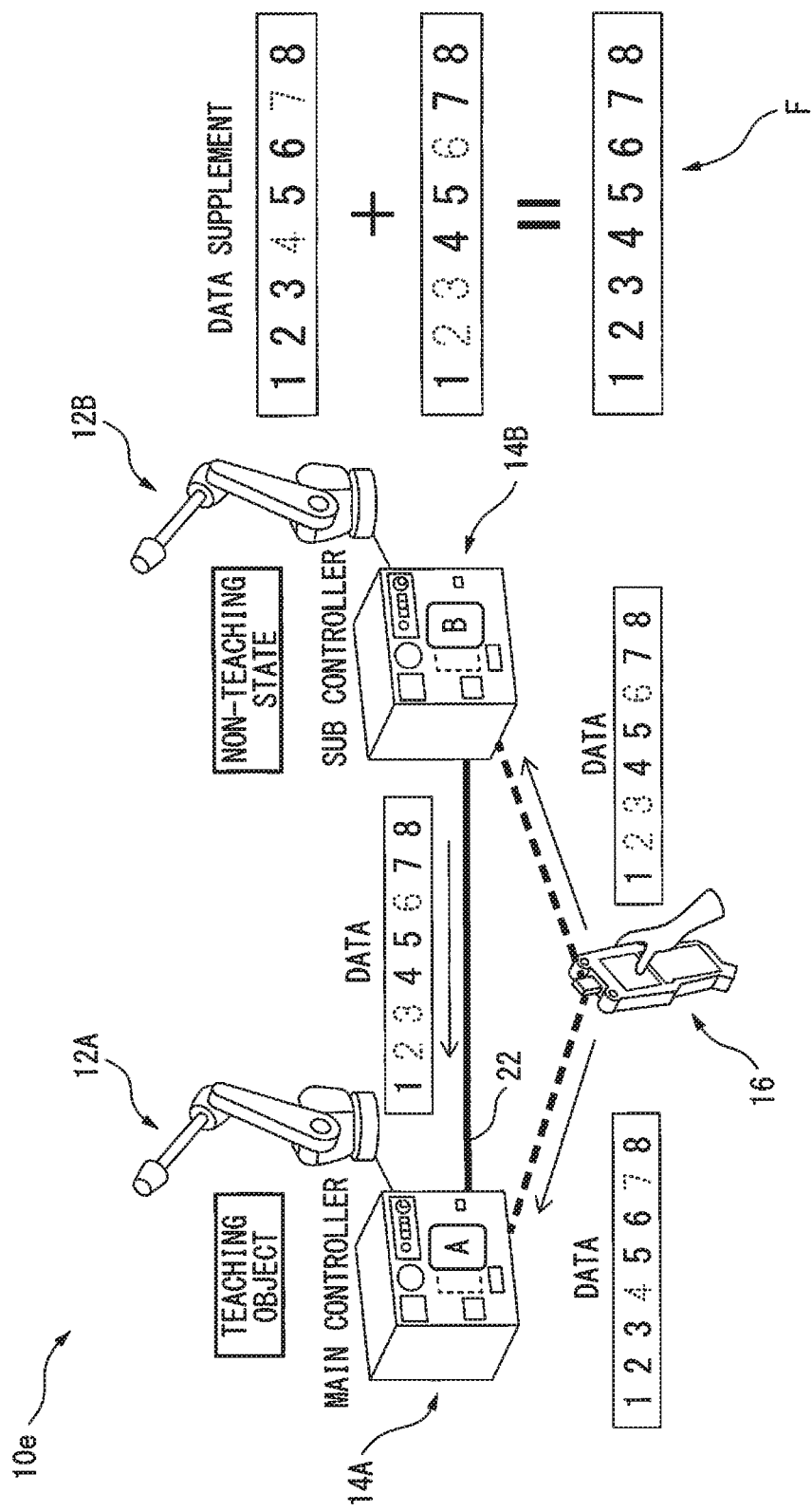
FIG. 6 shows an example for complementing data by the present invention.

FIG. 6 shows an example for complementing data by the present invention. A wireless system 10e of FIG. 6 includes a plurality of machines (in the embodiment, robots) 12A and 12B, and the same number of controllers 14A and 14B as the robots, which are configured to respectively control robots 12A and 12B. When one of the robots should perform a specified operation such as teaching, the human (operator) uses wireless teaching pendant 16 so as to carry out the teaching operation. Controllers 14A and 14B have (generally, incorporate) wireless module A and B, respectively, for wirelessly communicating with teaching pendant 16. In addition, each of wireless modules A and B may have a configuration of the wireless repeater as in the first embodiment.

In the example of FIG. 6, robot 12A is (the main machine) to be taught, and wireless module B of controller robot 14B is used to multiplex the signals. In this example, it is assumed that data (or a signal) to be transmitted from wireless teaching pendant 16 to main controller 14A should be "12345678," whereas there is lacking data in first data directly transmitted from teaching pendant 16 to controller 14A (concretely, "4" and "7" are lacked).

At this point, when the data transmitted from wireless teaching pendant 16 to main controller 14A is previously provided with information, such as a number or time point, representing a point of time when the data is transmitted, the lacking data may be complemented. For example, as shown in FIG. 6, it is assumed that there is lacking data also in second data, which is transmitted from teaching pendant 16 to sub controller 14B at the same timing as the first data (concretely, "2," "3" and "6" are lacked). Even in this case, as indicated by a section F in FIG. 6, main controller 14A can complement the lacking data, whereby the proper data "12345678" can be correctly received.

As explained above, when there is lacking data, the lacking data can be complemented by using the plurality of sets of data transmitted at the same timing, and by multiplexing the signals by using the plurality of transmission routes. Further, as the number of the transmission routes (or the wireless repeaters) is increased, the possibility of receiving the complete data is increased, even if data is lacking.

In the embodiments of FIGS. 3 to 6, with respect to a line between the controller and the wireless operation panel (teaching pendant) and a line between each controller, a solid line represents a wire such as a network, and a dashed line represents a wireless or radio communication. In this regard, the solid line (or the wire communication) can be replaced with the dashed line (or the wireless communication). For example, both the communication between the controller and the wireless operation panel (teaching pendant) and the communication between each controller may be carried out by radio.

Two or more embodiments of FIGS. 1 to 6 may be properly combined. For example, both the wireless access point of FIG. 1 and the wireless module of FIG. 2 may be used as the wireless repeaters. Further, before the usable wireless module as shown in FIG. 4 is presented to the operator, the automatic judging/selecting process as shown in FIG. 5 may be executed.

In the preferred embodiments as explained above, the safety signal transmitted between the wireless operation panel (teaching pendant) and the controller can be multiplexed by using the wireless device (module) in the controller not to be taught, the factory network, and/or the wireless repeater, so that the signal is not interrupted. It is preferable that the signals be multiplexed by using the same frequency band (channel). Concretely, the channel of the wireless module of the sub controller (in the automatic operation mode, etc.) may be switched so as to correspond to the channel of the wireless module of the main controller (in the teaching mode), so that the frequencies of the wireless modules coincide with each other. Further, the timing of switching the channel may correspond to the timing of operating the teaching pendant (e.g., the timing of operating the button, or detecting a certain level of acceleration by using a built-in acceleration sensor).

The wireless system (robot system) of FIGS. 1 to 5 may be incorporated in a production management system and may be used as a production cell. In this case, the production management system may include a cell controller configured to communicate with the production cell, and a production scheduling unit configured to communicate with the cell controller. The cell controller may manage and control the production cell based on production schedule information received from the production scheduling unit.

In the present disclosure, the teaching pendant may be the concrete example of the operation panel.

According to the present disclosure, the signals from the wireless operation panel can be multiplexed via the plurality of transmission routes before being received. Therefore, except that the signal communication is interrupted in all of the transmission routes, the operation of the wireless operation panel cannot be stopped or suspended, whereby the operation can be efficiently carried out.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A controller for controlling a machine, the controller comprising a wireless signal transceiver configured to wirelessly communicate with a wireless operation panel configured to operate the machine,
   wherein, in a teaching mode of the machine, the wireless signal transceiver is configured to receive a multiplexed signal generated by multiplexing
      a first wireless signal for teaching the machine directly from the wireless operation panel, and
      a second wireless signal for teaching the machine from the wireless operation panel via at least one wireless repeater,
   wherein the at least one wireless repeater comprises a further controller controlling a further machine in a non-teaching mode,
   wherein, in the teaching mode of the machine, the machine is controlled by the multiplexed signal, and
   wherein, in the non-teaching mode of the further machine, the further machine is not controlled by the second wireless signal from the wireless operation panel.

2. The controller as set forth in claim 1, wherein the at least one wireless repeater includes another wireless signal transceiver provided to the further controller.

3. The controller as set forth in claim 1, wherein there is a plurality of wireless repeaters, and the controller is configured to designate a wireless repeater of the plurality of wireless repeaters to multiplex the signals among the plurality of wireless repeaters.

4. The controller as set forth in claim 1, wherein there is a plurality of wireless repeaters, and the controller is configured to inform an operator about a wireless repeater of the plurality of wireless repeaters designated to multiplex the signals among the plurality of wireless repeaters.

5. The controller as set forth in claim 1, wherein there is a plurality of wireless repeaters, and the controller is configured to automatically judge and select a wireless repeater of the plurality of wireless repeaters designated to multiplex the signals among the plurality of wireless repeaters.

6. The controller as set forth in claim 1, wherein the multiplexed signal is provided with information by which a point of time when the multiplexed signal is transmitted, and the controller is configured to, when there is lacking data, complement the data by using a signal provided with the information.

7. The controller as set forth in claim 1, wherein the wireless signal transceiver is configured to receive the first wireless signal and the second wireless signal at the same time.

8. A controller for controlling a machine, the controller comprising a wireless signal transceiver configured to wirelessly communicate with a wireless operation panel, wherein in a non-teaching mode of the machine when the machine is not operated by a first wireless signal from the wireless operation panel, and when a further machine in a teaching mode is taught by the first wireless signal transmitted from the wireless operation panel to a further controller of the further machine,
  the wireless signal transceiver is configured as a wireless repeater to receive the first wireless signal from the wireless operation panel and transfer the first wireless signal, as a second wireless signal, to the further controller which is configured to obtain a multiplexed signal by multiplexing
    the first wireless signal for teaching the further machine received directly from the wireless operation panel, and
    the second wireless signal for teaching the further machine received from the wireless operation panel via the wireless signal transceiver.

9. The controller as set forth in claim 8,
wherein the wireless signal transceiver is configured to
  receive a signal having one of frequencies which are respectively assigned to a plurality of controllers,
  identify or select a controller corresponding to the frequency of the received signal, among the plurality of controllers, and
  transfer the received signal to the identified or selected controller.

\* \* \* \* \*